Figure 1:
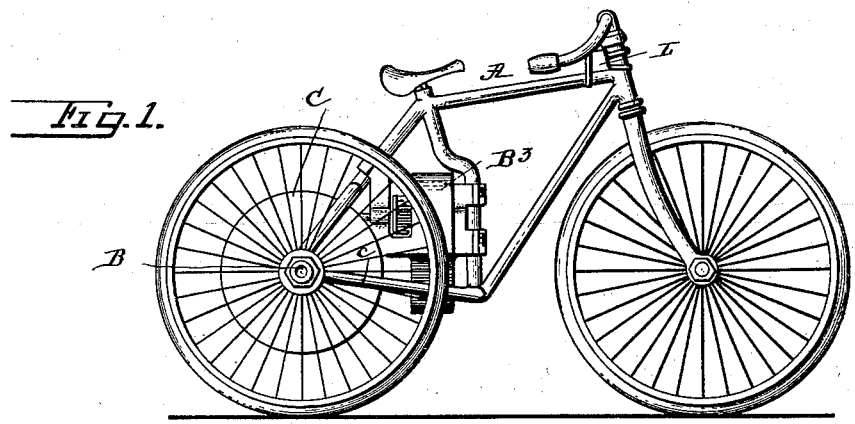

No. 650,014. Patented May 22, 1900.
I. KITSEE.
ELECTRIC MOTOCYCLE.
(Application filed July 3, 1899.)

(No Model.) 3 Sheets—Sheet 1.

Witnesses. Inventor.

No. 650,014. Patented May 22, 1900.
I. KITSEE.
ELECTRIC MOTOCYCLE.
(Application filed July 3, 1899.)
(No Model.) 3 Sheets—Sheet 2.
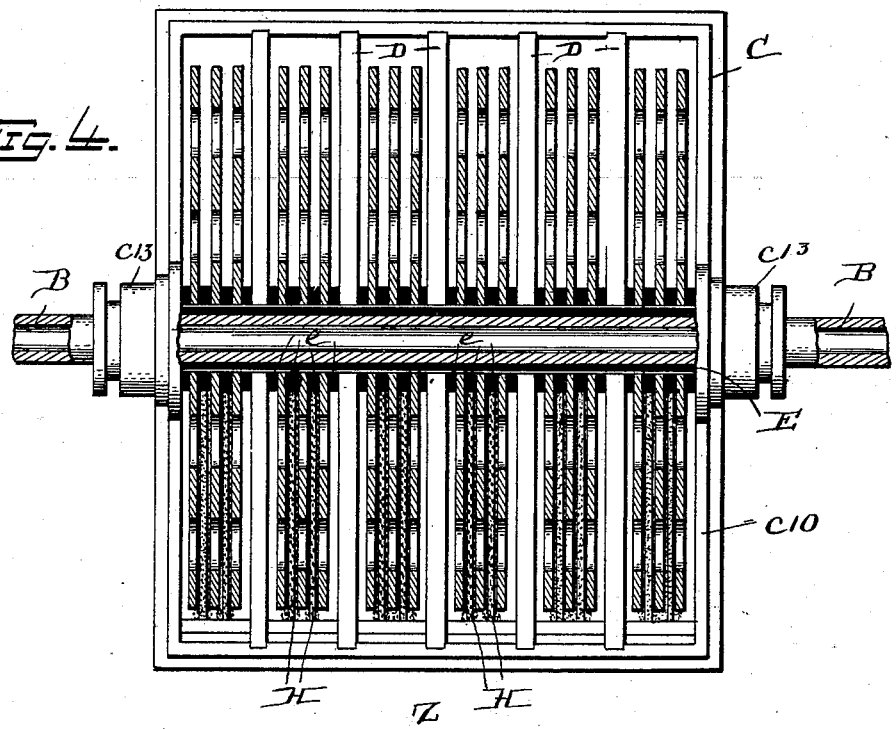
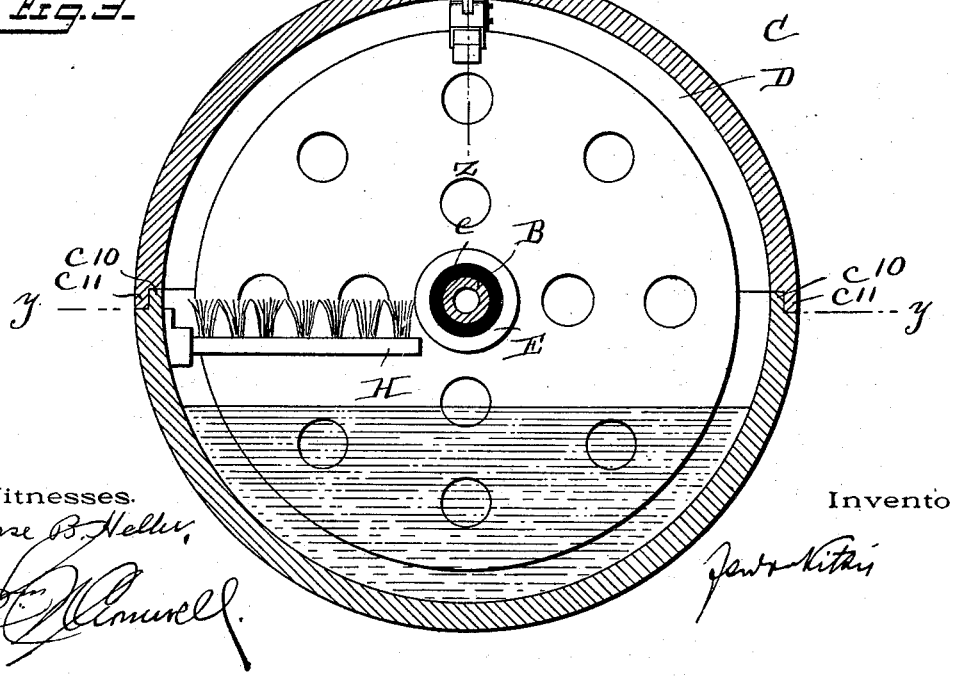
Witnesses. Inventor.

No. 650,014. Patented May 22, 1900.
I. KITSEE.
ELECTRIC MOTOCYCLE.
(Application filed July 3, 1899.)

(No Model.) 3 Sheets—Sheet 3.

Witnesses. Inventor.

THE NORRIS PETERS CO., PHOTO-LITHO., WASHINGTON, D. C.

UNITED STATES PATENT OFFICE.

ISIDOR KITSEE, OF PHILADELPHIA, PENNSYLVANIA.

ELECTRIC MOTOCYCLE.

SPECIFICATION forming part of Letters Patent No. 650,014, dated May 22, 1900.

Application filed July 3, 1899. Serial No. 722,755. (No model.)

*To all whom it may concern:*

Be it known that I, ISIDOR KITSEE, of the city and county of Philadelphia, in the State of Pennsylvania, have invented certain new and useful Improvements in Electric Motocycles, of which the following is a specification.

My invention relates to electric motocycles, and has more especially reference to the batteries employed in such cycles.

The object of my invention is to produce an efficient battery for such motocycles and one the depolarization of which is facilitated through the movement of parts of the cycle.

As is well known, the greatest difficulty in the employment of primary cells for motive power lies in the depolarization of the negative element. If the depolarizing compound is dissolved in the liquid, the great disadvantage arises that if present in necessary large quantities the liquid will attack the zinc to such a great extent as to make the battery practically valueless for long work, and if the depolarizing material is only sparingly added to the exciting fluid the same is easily exhausted and needs renewal at short intervals if a comparative-large current is drawn from the battery. Solid depolarizers have to be present in such large quantities as to make the weight of the battery too heavy for use on motocycles.

The weight of the battery in bicycles is of great importance; so also the quality of the exciting fluid; so also the length of time the battery is capable of giving out the necessary amount of energy without replenishing. In view of all these requirements I have recourse to the method and arrangement as illustrated in the drawings, described in this specification, and more especially pointed out in the claims following the specification.

Figure 2:
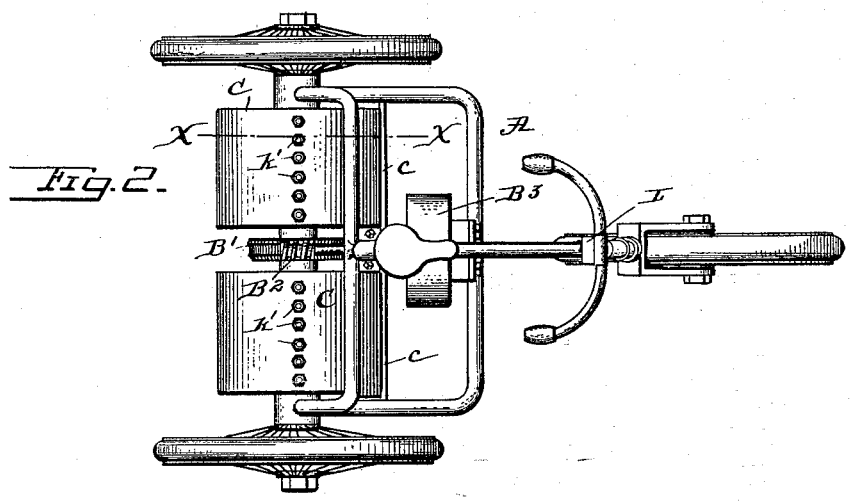
Figure 5:
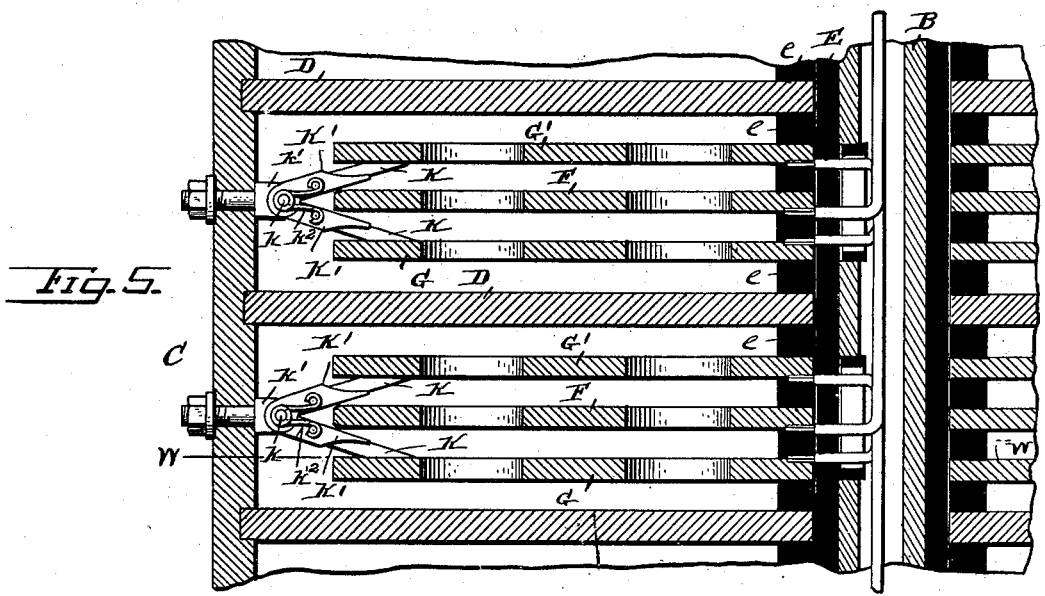
Figure 6:
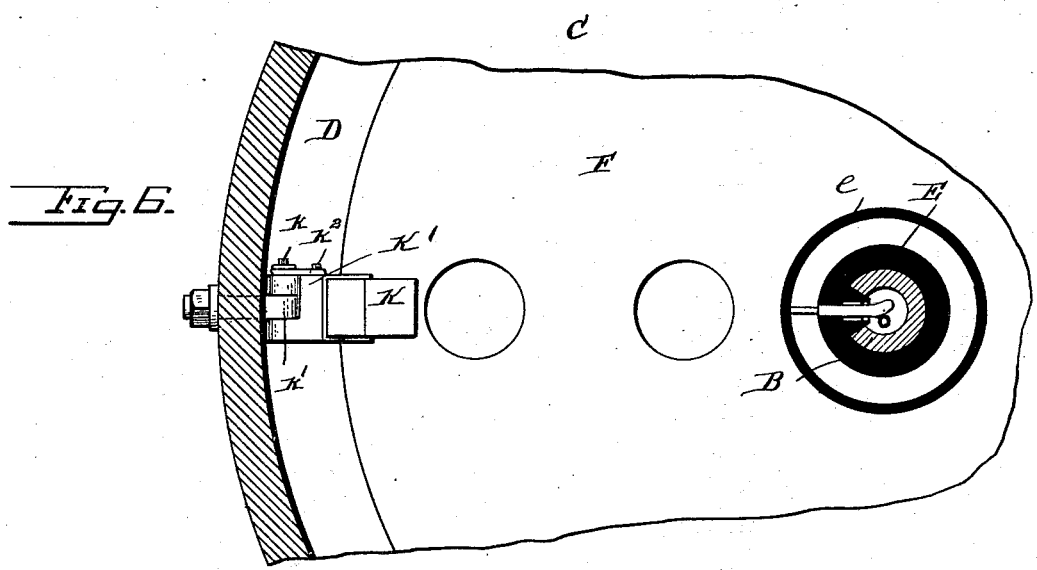

Figure 1 is a side elevation of a tricycle with my improved battery attached. Fig. 2 is a plan view of the same. Fig. 3 is a section on the line X X of Fig. 2. Fig. 4 is a similar view on the line Y Y of Fig. 3. Fig. 5 is a section on the line Z Z of Fig. 3. Fig. 6 is a similar view on the line W W of Fig. 5.

A is the tricycle; B, the driving-shaft, mounted in suitable bearings.

B' is a worm-wheel keyed or otherwise secured to the shaft B.

$B^2$ is a worm secured to the shaft of the motor $B^3$ and meshing with the worm-wheel B'.

C is the battery, loosely mounted on the driving-shaft and secured to the framework of the cycle at $cc$. This battery is composed of two sets, and each set is divided into six cells by the division-walls D. The casing of each battery is made of two half-drums, so as to permit separation thereof in order to ascertain the condition of the batteries; but this does not constitute an essential part of my invention, as the upper parts of the plates do not need to be covered at all, if so desired; but I prefer to cover them in order to keep out dust or other foreign matter. The lower half has a projecting flange $c^{10}$ and the upper half a flange $c^{11}$, which overlies the flange $c^{10}$, thereby forming a rabbeted joint. (See Fig. 3.)

$c^{12}$ represents openings in the top of the casing for the escape of the gases, and $c^{13}$ represents stuffing-boxes.

E is a bushing or sleeve secured to the shaft. To this bushing are secured the zinc plates F and the carbons G and G'. These elements are separated from each other by the washers $e$ on the bushing E.

H represents a series of brushes secured to the walls of the batteries C C.

K K are the depolarizing-blocks.

K' represents the holders, loosely mounted on the pins $k$ of the brackets $k'$, secured to the wall of the battery. The blocks K are held in contact with the carbons G and G' by means of the springs $k^2$.

As stated, the elements of the battery consist of carbon and zinc plates. As the excitant I prefer to use a solution of chlorid of ammonia with the addition of a very small quantity of sulfuric acid in the proportion of, say, fifteen or twenty to one. As depolarizing-blocks either high oxid of lead compressed in the necessary shape or a bichromate, also compressed or molded, may be used. If a high oxid of lead is used, the hydrogen on the carbon becomes neutralized through the combination of part of oxygen of the oxid blocks; but the depolarization is greatly facilitated through the generation of chlorin due to the chemical interchange which results in converting the chlorid into a sulfate.

The action of a bichromate of potassium or sodium as a depolarizer in voltaic cells is well understood and does not need any further explanation.

In voltaic cells in action the continuous moving of the electrode greatly facilitates the disengagement of the hydrogen. So also will the exposure to the air add to the depolarizing process. The brushing of the positive electrode alone would, if it could be carried on continuously, almost entirely displace the hydrogen, and thereby depolarize the element, and in the arrangement as described I have taken advantage of all the enumerated agencies.

The *modus operandi* is the following: The elements are, as stated above, securely placed in position and the compartments filled with the excitant liquid. The depolarizing-blocks are secured to the holders, the tongues of which are so actuated by springs that they always press the block ends against the surface of the carbon. When the cells are now mounted on the cycle, the first momentary flow of the current will actuate the motor and the wheels will revolve; but as the carbon elements are fastened on the revolving shaft of the cycle and as the brushes and depolarizer-blocks are stationary it is evident that the brushes and blocks will come successively in contact with successive parts of these negative elements or carbons, and as the rotation of the carbon plates is a continuous one the depolarization will also be uninterrupted, securing the employment of an element practically without polarization; but I prefer that the positive element should also be in contact with the brushes, as clearly illustrated in the drawings, for the reason that the clean zinc surface is better adapted for the generation of heavy currents.

The material of the depolarizing-blocks has to be renewed at intervals and so also has the exciting fluid. So also can the zinc be made of any required thickness, necessitating renewals at shorter or longer intervals.

To facilitate the drawing off of the old and refilling with the new liquid, a hose connected to one of the well-known suction contrivances can be inserted in the battery. I have described the depolarizing-blocks to consist of a high oxid or a bichromate; but any other suitable material may be used, and if it is preferred to use as a depolarizer a liquid compound it is best to replace the solid blocks with hollow receptacles filled with absorbent material impregnated with the depolarizing fluid.

I have described the elements of the battery as secured direct to the shaft or axle; but, if preferred, the connection can be made indirect with the intervention of a crank or other suitable device. I have also described my invention as applied to a motocyle; but any other vehicle may be substituted for the cycle, and as vehicles propelled by electricity are known under the general name of "automobile vehicles" or "motocycles" I had to select one of these two names, and I therefore understand the expression "motocycles" in this specification or claims following this specification to mean a vehicle adapted to be propelled by an electric current, no matter of what construction such vehicle may be.

I have described and illustrated my invention as carried out with stationary brushes and revolving carbon plates; but the carbon plates may be stationary and the brushes revolving on the shaft. I deem it unnecessary to illustrate this modification, as persons versed in the art will readily understand that the results in both cases are alike. All that is necessary is that the brushes or the depolarizing-blocks, or both, shall come in contact successively with successive parts of the negative element or carbon plate.

Wherever I use in the specification or claims the words "solid depolarizer" I understand the same to mean any depolarizing agent other than liquids or gases, and wherever I use the word "blocks" I understand the same to mean a depolarizer compressed into one or more mechanical units irrespective of the shape or form they may possess, and the word "solid" as in contradistinction to "liquid" or "gas" includes also means which may be partially or entirely yielding.

Having now described my invention, what I claim as new, and desire to secure by Letters Patent, is—

1. A battery comprising positive and negative electrodes, solid chemical depolarizing material in contact with said negative electrodes, and means for causing said depolarizing material to move over the surface of said negative electrodes.

2. A battery comprising positive and negative electrodes, solid chemical depolarizing material in contact with said negative electrodes, and means to bring in contact successively successive parts of said negative electrodes with said depolarizing material.

3. A self-propelled vehicle comprising an electric motor, and a voltaic battery, said battery having a positive and negative electrode, a solid body in contact with and movable over the surface of the negative electrode, and provided with means for depolarizing successive portions of said electrode during such movement, and a connection between the vehicle-driving shaft and the battery, whereby motion of said shaft causes relative movement of the negative electrode and the depolarizing-body.

4. A self-propelled vehicle comprising an electric motor, and a voltaic battery, said battery having a positive and negative electrode, a solid body in contact with the surface of the negative electrode, said body and electrode being movable relatively to each other, said body being provided with means for depolarizing successive portions of said electrode during such relative movement, and a connection between the vehicle-driving shaft and the battery, whereby motion of said shaft causes relative movement of the negative electrode and the depolarizing-body.

5. In an electrically-propelled vehicle, voltaic cells as means for supplying power to the motor of said vehicle, said cells each comprising positive and negative electrodes and a solid depolarizing-body in contact with and movable relative to the negative electrode, in combination with mechanical means secured to the driving-shaft of said vehicle, whereby relative movements are caused between the negative elements of said cells and said depolarizing means.

6. In an electrically-propelled vehicle, voltaic cells as means for supplying power to the motor of said vehicle, said cells being provided with depolarizing means in yielding contact with the negative elements of said cells, and a mechanical connection between the vehicle-driving shaft and the battery, whereby motion of said shaft causes relative movement of said negative elements and said depolarizing means.

7. In an electrically-propelled vehicle, a motor, electric batteries as means for supplying power thereto, said batteries being provided with rotary electrodes, and also having brushes and depolarizing-blocks, said brushes and blocks being arranged in juxtaposition to and in contact with the negative elements of the batteries, and operative connections between the motor and the batteries for rotating said electrodes.

8. In an electrically-propelled vehicle, a motor, electric batteries as means for supplying power thereto, said batteries being provided with brushes and depolarizing-blocks, said brushes and blocks being arranged in juxtaposition to and in contact with the negative elements of the batteries, and operative connections between the motor and the batteries, whereby relative movements are caused between said negative elements and the brushes and depolarizing-blocks.

In testimony whereof I sign my name, in the presence of two subscribing witnesses, this 24th day of June, A. D. 1899.

ISIDOR KITSEE.

Witnesses:
  E. R. STILLEY,
  WALLACE B. ELDRIDGE.